INVENTOR.
CLYDE S. SCANLEY
BY
*Frank M. Van Zeit*
ATTORNEY

United States Patent Office 3,414,552
Patented Dec. 3, 1968

3,414,552
SIMULTANEOUS HYDROLYSIS AND POLYMERIZATION OF ACRYLAMIDES
Clyde Stephen Scanley, Stamford, Conn., assignor to American Cyanamid Company, Stamford, Conn., a corporation of Connecticut
Filed June 29, 1964, Ser. No. 378,578
6 Claims. (Cl. 260—89.7)

ABSTRACT OF THE DISCLOSURE

A simultaneous process for the polymerization and hydrolysis of an acrylamide at a temperature of from about 5° C. to 100° C. and in the presence of a catalyst and an alkaline hydrolyzing agent wherein a neutral alkaline metal salt is added to the reaction media in an amount ranging from about 8% to about the saturation point of said salt in the reaction media.

---

Figure 2:
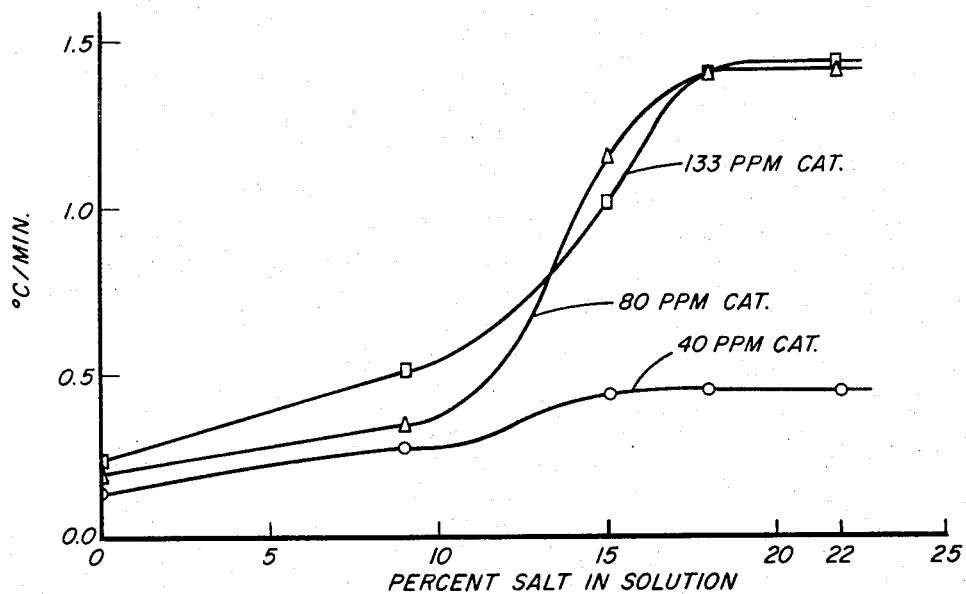

Various procedures for the simultaneous polymerization and hydrolysis of acrylamide compounds have been set forth in the prior art. One of these procedures is set forth in U.S. Patent No. 2,820,777 to Suen et al. wherein an equeous solution of an acrylamide monomer is contacted with a polymerization catalyst and a critical amount of an alkali metal hydroxide. Another procedure is set forth in U.S. Patent No. 3,022,279 wherein an aqueous solution of acryamide is contacted with a polymerization catalyst and a critical amount of sodium carbonate. Other procedures for the production of hydrolyzed polymer compositions include the copolymerization of acrylamide and acrylic acid and also the controlled hydrolysis of polyacrylamide. The latter two procedures are commercially and economically unattractive because (1) two compounds generally must be employed and (2) two procedural steps must be followed. In regard to the alkali metal hydroxide technique, while the compositions produced thereby are useful for a great many commercial applications, the relatively low molecular weight of the final product renders it inapplicable for certain uses wherein very high molecular weight materials are essential, e.g. mud flocculation.

While the sodium carbonate technique results in somewhat higher molecular weight products than the hydroxide process, the time of contact of the monomer with the catalyst is of such length that the process itself is of less commercial feasibility, primarily from an economic standpoint.

I have now found a procedure for the production of acrylamide polymers, containing both amide and carboxylate moieties, which results in the production of very high molecular weight compositions at an increased rate of polymerization. My process therefore is more commercially attractive than those of the prior art since higher molecular weight products can be more rapidly produced at a substantial decrease in processing costs.

It is therefore an object of the present invention to provide a novel single-step, continuous process for the simultaneous polymerization and hydrolysis of acrylamide and its alkyl α-substituted derivatives.

It is a further object of the present invention to provide a novel process for the polymerization and hydrolysis of an acrylamide to a high molecular weight composition at an increased rate of polymerization.

These and other objects will become more apparent to one skilled in the art upon reading the more detailed description set forth hereinbelow.

The simultaneous polymerization and hydrolysis of acrylamide is an exacting procedure which necessitates careful scrutiny. For example, in order to control the degree of polymerization and degree of hydrolysis of the acrylamide, it is necessary that the temperature during the polymerization and hydrolysis be carefully observed since polymerization increases as temperature decreases and hydrolysis increases as temperature increases. Furthermore, the residence time of the reactants during the reaction must be considered since polymerization decreases as residence time increases and hydrolysis increases as temperature increases.

The amount of water present during the simultaneous polymerization and hydrolysis of acrylamide is not critical from a process standpoint, however, a certain amount of water must be present in order to obtain a hydrolyzed product. On the other hand, a large excess of water does not materially affect the reaction. Determination of such factors as the desired molecular weight and solids content of the final product, among other variables, generally govern the amount of water which is necessary during the reaction period.

In accordance with the above features, the polymerization and hydrolysis of the acrylamide according to my invention should be conducted at a temperature range of from about 5° C. to about 100° C., preferably from about 25° C. to about 80° C. at a residence time of from about 30 minutes to about 24 hours, preferably from about 60 minutes to about 12 hours. The longer residence time being primarily for the hydrolysis reaction. Generally, the polymerization reaction is complete in about 2 hours.

Any suitable means may be employed in effecting the polymerization of the acrylamide during the simultaneous polymerization and hydrolysis thereof. Heat, light or both heat and light with or without a polymerization catalyst may be used. It is also possible to effect polymerization as a result of gamma radiation, such as from cobalt 60, radium or other radioactive material. A polymerization catalyst, however, is preferably employed in order to further shorten the period of time required for polymerization of the acrylamide. Any polymerization catalyst which is suitable for use in polymerizing compounds containing an ethylenically unsaturated grouping, specifically a vinyl grouping, may be used. The catalysts may be used alone or as a redox system with water-soluble activator. Among the catalysts found useful when used alone are the inorganic peroxides, e.g., hydrogen peroxide, barium peroxide, magnesium peroxide, etc., and the various organic peroxy catalysts, illustrative examples of which are: the dialkyl peroxides, e.g., diethyl peroxide, dipropyl peroxide, the alkyl hydrogen peroxides, e.g., teritiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, malonyl peroxide, succinyl peroxide, benzoyl peroxide, etc.; and salts of inorganic per-acids, e.g. ammonium persulfate, sodium persulfate, potassium persulfate, sodium perborate, potassium perborate, etc. Other so-called "free-radical" types of catalysts, e.g., a,a'-azodiisobutyronitrile, also can be used to initiate polymerization.

Illustrative examples of water-soluble activators of the redox catalyst systems which may be used with the catalysts mentioned hereinabove are the oxygen-containing sulfur compounds which are capable of undergoing oxidation, for instance, sulfur dioxide, the alkali metal (e.g. sodium, potassium, etc.) bisulfites, hydrosulfites, thiosulfates, sulfurous acid (or compounds which engender sulfurous acid), e.g., alkali metal sulfites, ethyl and other alkyl sulfites, etc., various organic sulfinic acids, e.g., p-toluene sulfinic acid, formamidine sulfinic acid, etc.

The amount of catalyst used may be varied over a fairly wide range depending, for example, upon the particular kind of catalyst used and other polymerization conditions. A general range, for instance, from about 0.0001% to about 0.5% or even as high as 1.0% or more, based on the total weight of the reaction media, i.e. the acrylamide, the water, the hydrolyzing agent, the neutral salt and the catalyst, is considered tolerable. Preferably, however, the amount of catalyst should be within the range of about 0.001% to about 0.3% or 0.4%. The amount of polymerization adjuvant or activator used also may be varied considerably, but generally, a range of from about 0.001% to 0.3%, same basis or an amount which is chemically equivalent to the amount of catalyst employed, is considered satisfactory. The use of higher ratios of activator with respect to the catalyst is not precluded, e.g., 2 or 3 or more mols of activator per mol of catalyst, or correspondingly larger proportions on a chemically equivalent basis, but no particular advantages ordinarily accrue therefrom.

The polymerization reaction is best effected if the aqueous medium is maintained under an atmosphere of an inert gas, for example, nitrogen, neon, argon, helium and the like.

Chain-regulating or chain-transfer agents may also be present in the reaction mixture during the continuous polymerization and hydrolysis of the acrylamide or its alkyl alpha-substituted derivative. When such an agent is present, it is preferably kept within the range of from about 0.01% to about 100%, by weight, based on the total weight of the monomeric materials present. Such compounds as water-soluble alcohols, e.g., methyl alcohol, ethyl alcohol, isopropyl alcohol and the like; mercaptans and their derivatives, e.g., thioglycol, thioglycolic acid, methylthioglycolate and the like, may be used for this purpose.

In certain instances, it may be desirable to incorporate other monomeric materials into the reaction zone in order to form copolymers with the acrylamide or its derivative. In the event that other molecular materials are copolymerized with the acrylamide, it is necessary that the amount utilized be such that the water-soluble characteristics of the continuously polymerized and hydrolyzed acrylamide not be destroyed. Examples of monomeric materials that may be used herein are such as the styrene, acrylonitrile, methylacrylate, methyl methacrylate, vinyl acetate and the like.

The alkaline hydrolyzing agents which may be employed to effect the hydrolysis of the acrylamide polymer formed may be any such agent known in the art. Among the preferred agents are such compounds as sodium carbonate, the alkali metal hydroxides such as lithium hydroxide, sodium hydroxide, potassium hydroxide and the like in a molar ratio of hydrolyzing agent to acrylamide ranging from about 0.01:1 to about 1.0:1.0, preferably from about 0.03:1 to about 0.75:1, respectively.

As mentioned above, the novel aspect of the process of the present invention resides in the addition of various neutral alkali-metal salts to the aqueous reaction medium containing the monomer, catalyst and alkali metal hydroxide. That is to say, I have found that the addition of alkali metal salts, which, when in solution, result in a neutral pH, to the reaction media results in an increased rate of polymerization and an increase in the molecular weight of the resultant composition over known procedures wherein no neutral alkali-metal salt is used. Examples of salts which may be utilized for this purpose include lithium chloride, lithium sulfate, lithium nitrate, neutral lithium phosphate ($LiH_2PO_4$), sodium chloride, sodium sulfate, sodium nitrate, neutral sodium phosphate ($NaH_2PO_4$), potassium chloride, potassium sulfate, potassium nitrate, neutral potassium phosphate ($KH_2PO_4$) and the like.

The amount of neutral alkali metal salt added to the reaction media in accordance with my invention is critical and ranges of from about 8%, by weight, based on the total reaction media, i.e. the water, the acrylamide, the catalyst, the hydrolyzing agent and the neutral salt, to about the saturation point of the salt, in the aqueous monomer solution. A range of about 12 percent to 20 percent, by weight, same basis, is generally preferred. At lower concentrations the effectiveness of the salt diminishes progressively, while at concentrations above the saturation point of the solution, no appreciable increase in molecular weight or rate of polymerization is observable.

The molecular weight of the compositions produced according to the present process may vary from about 25,000 to about 5,000,000 or even as high as 10,000,000 as determined from the intrinsic viscosity of the composition at 25° C. in 1 N sodium chloride at a pH of 8. The final products should possess at least 3 mol percent of hydrolysis products, i.e. hydrolyzed groups, and not more than about 70 mol percent, although a higher or lower degree of hydrolysis may be tolerable for certain desirable end uses of the product.

Figure 1:
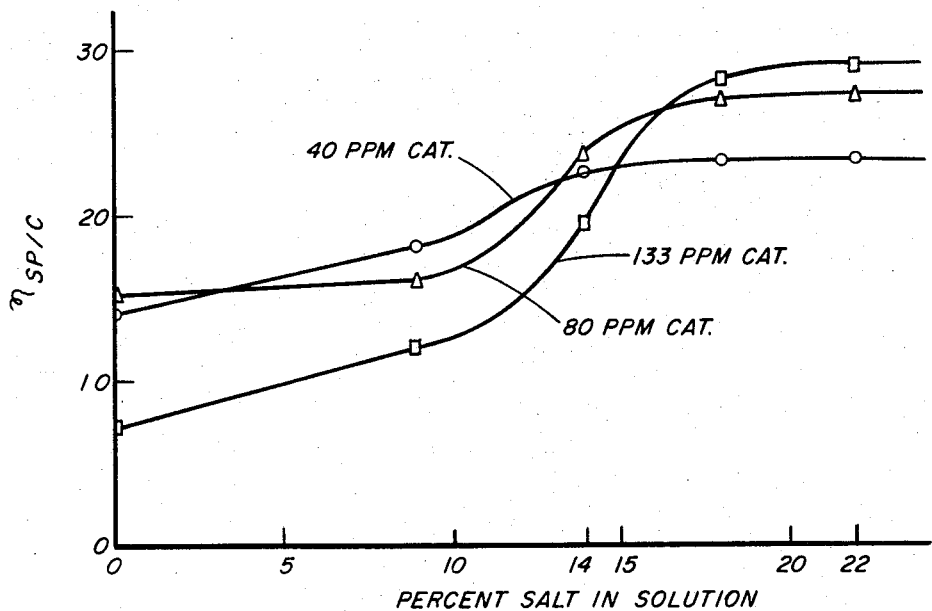

The accompanying drawing sets forth graphic representations of the effect achieved by the process of my invention. FIGURE 1 shows the effect of the addition of neutral salts on the specific viscosity, i.e. the molecular weight, of the resultant acrylamide polymer. As the percent salt in solution is increased to about 8%, the specific viscosity is suddenly increased, regardless of the catalyst concentration, while the addition of more than about 20%, i.e. about the saturation point of the salt, causes no further change. The salt used was sodium sulfate, the hydrolyzing agent was sodium hydroxide and the catalyst was ammonium persulfate-nitrilotrispropionamide.

FIGURE 2 depicts the increase in the rate of polymerization (as measured by exotherm; ° C./min. at 34–44° C.) as the percent salt is increased. Again at about 8% salt in the reaction media, the rate of polymerization suddenly increases, while at about 20%, i.e. the saturation point, the curve levels off. The same salt and catalyst are again used. Although the catalyst concentration appears to have some bearing on the degree of increase in polymerization rate, it can be seen that even with small amounts of catalyst, an increase in polymerization rate resulted. The results shown in the drawing were plotted from the examples set forth hereinbelow.

The following examples are set forth for purposes of illustration only and are not to be construed as limitations on the present invention except as set forth in the appended claims. All parts and percentages are by weight unless otherwise specified.

EXAMPLE 1

Into a suitable reaction vessel equipped with a thermometer, nitrogen inlet and outlet and catalyst and salt inlets are added 27 parts of acrylamide, 210 parts of water and 54 parts of sodium sulfate, i.e. 18% of the reaction media. The system at 30° C. is purged of oxygen by injecting nitrogen gas into the reaction vessel. 3.8 parts of sodium hydroxide are then added as a 50% solution in water, followed immediately by 0.024 part of nitrilotrispropionamide and 0.024 part of ammonium persulfate, each as a 4% aqueous solution. These amounts correspond to 80 parts/million of solid catalyst in the reaction mixture. The reaction vessel temperature rises to 60° C. during the exotherm of the reaction and the system is then maintained at 60° C. for 8 hours. The rate of polymerization is 1.4° C. per minute over the range of 34–44° C. The specific viscosity of a 0.1% solution of resultant polymer in 1 N NaCl is 2.7 at pH 8.0. The conversion to polymer is 96% as determined by dialysis of the recovered product, evaporation of the polymer retained and drying. The polymer is then titrated conductimetrically for carbonyl content. The polymer is found to be hydrolyzed to the extent of 30–30% (as percent acrylic acid group in polymer).

EXAMPLES 2-25

Following the procedure of Example 1, except utilizing various neutral salts, percentages, hydrolyzing agents, catalyst concentrations etc., various polymers were recovered. The results of these additional runs are set forth hereinbelow in Table I.

TABLE I

| Ex. | Neutral salt | Percent | Rate of polymerization,[2] °C./min. | Molecular weight ($\beta$SP/C)[1] | Hydrolyzing agent | Cat. (p.p.m.) | Percent con. |
|---|---|---|---|---|---|---|---|
| 2 | $Na_2SO_4$ | 18 | 1.4 | 2.8 | NaOH | 133 | |
| 3 | $Na_2SO_4$ | 18 | 0.46 | 2.2 | NaOH | 40 | |
| 4 | | | 0.30 | 0.75 | NaOH | 133 | |
| 5 | | | 0.20 | 1.4 | NaOH | 40 | |
| 6 | | | 0.25 | 1.5 | NaOH | 80 | 82 |
| 7 | $Na_2SO_4$ | 9 | 0.35 | 1.6 | NaOH | 70 | 89 |
| 8 | $Na_2SO_4$ | 9 | 0 25 | 1.8 | NaOH | 40 | |
| 9 | $Na_2SO_4$ | 9 | 0.50 | 1.2 | NaOH | 133 | |
| 10 | $Na_2SO_4$ | 14 | | 2.3 | NaOH | 80 | |
| 11 | $Na_2SO_4$ | 14 | | 1.9 | NaOH | 133 | |
| 12 | $Na_2SO_4$ | 14 | | 2.25 | NaOH | 40 | |
| 13 | $Na_2SO_4$ | 15 | 0.45 | | NaOH | 40 | |
| 14 | $Na_2SO_4$ | 15 | 1.2 | | NaOH | 80 | |
| 15 | $Na_2SO_4$ | 15 | 1.0 | | NaOH | 133 | |
| 16 | $Na_2SO_4$ | 22 | 0.46 | 2.2 | NaOH | 40 | |
| 17 | $Na_2SO_4$ | 22 | 1.4 | 2.71 | NaOH | 80 | |
| 18 | $Na_2SO_4$ | 22 | 1.41 | 2.82 | NaOH | 133 | |
| 19 | KCl | 18 | 0.75 | 2.2 | NaOH | 80 | |
| 20 | NaCl | 18 | 0.75 | 2.6 | NaOH | 80 | |
| 21 | LiC. | 15 | 0.47 | 2.2 | NaOH | 40 | |
| 22 | $Na_2SO_4$ | 8.5 | 0.73 | 3.8 | $NaCO_3$ (20 pts.) | 80 | |
| 23 | $NaNO_3$ | 18 | 1.3 | 2.1 | $NaCO_3$ (20 pts.) | 80 | |
| 24 | $NaH_2PO_4$[3] | 12 | 0.68 | 1.8 | KOH | 80 | |
| 25 | $K_2SO_4$ | 8 | 0.42 | 1.1 | NaOH | 133 | |

[1] Determined in 0.1% solution of polymer in 1 N NaCl at pH of 8.0.
[2] Determined by the length of time in minutes for exotherm to proceed from 34° C.-44° C.
[3] Methacrylamide monomer used.
Cat.=Catalyst; Con.=Conversion.

I claim:
1. In a process for the simultaneous polymerization and hydrolysis of acrylamide and its alkyl α-substituted derivatives, the alkyl group containing from 1 to 2 carbon atoms, wherein said acrylamide is reacted in an aqueous medium at a temperature within the range of from about 5° C. to about 100° C. in the presence of about 0.0001% to about 1.0%, based on the total weight of the reaction media, of a polymerization catalyst and from about 0.01:1 to about 1.0:1.0 mols, per mol of said acrylamide, of an alkaline hydrolyzing agent, the improvement which comprises conducting the reaction in the presence of a neutral alkali metal salt in an amount ranging from about 8%, based on total weight of the reaction media, to about the saturation point of said salt in said reaction media.

2. A method according to claim 1 wherein said neutral alkali metal salt is sodium sulfate.

3. A method according to claim 1 wherein said neutral alkali metal salt is sodium chloride.

4. A method according to claim 1 wherein said neutral alkali metal salt is potassium chloride.

5. A method according to claim 1 wherein said alkaline hydrolyzing agent is sodium hydroxide.

6. A method according to claim 1 wherein said alkaline hydrolyzing agent is sodium carbonate.

References Cited

UNITED STATES PATENTS

| 2,820,777 | 1/1958 | Suen et al. | 260—89.7 |
| 3,022,279 | 2/1962 | Proffitt | 260—89.7 |
| 3,215,680 | 11/1965 | Kolodny | 260—89.7 |

JOSEPH L. SCHOFER, Primary Examiner.

W. F. HAMROCK, Assistant Examiner.